United States Patent
Yamakawa et al.

(10) Patent No.: US 10,093,831 B2
(45) Date of Patent: Oct. 9, 2018

(54) COPOLYMERIZED POLYSILAZANE, MANUFACTURING METHOD THEREFOR, COMPOSITION COMPRISING SAME, AND METHOD FOR FORMING SILICEOUS FILM USING SAME

(71) Applicant: AZ Electronic Materials (Luxembourg) S.a.r.l., Luxembourg (LU)

(72) Inventors: Jun Yamakawa, Kakegawa (JP); Takashi Fujiwara, Kakegawa (JP); Takashi Kanda, Kakegawa (JP); Hiroyuki Aoki, Kakegawa (JP)

(73) Assignee: AZ Electronic Materials (Luxembourg) S.a.r.l., Luxembourg (LU)

(*) Notice: Subject to any disclaimer, the term of this patent is extended or adjusted under 35 U.S.C. 154(b) by 44 days.

(21) Appl. No.: 15/305,722

(22) PCT Filed: Apr. 22, 2015

(86) PCT No.: PCT/JP2015/062219
§ 371 (c)(1),
(2) Date: Oct. 21, 2016

(87) PCT Pub. No.: WO2015/163360
PCT Pub. Date: Oct. 29, 2015

(65) Prior Publication Data
US 2017/0044401 A1 Feb. 16, 2017

(30) Foreign Application Priority Data

Apr. 24, 2014 (JP) .................... 2014-089831

(51) Int. Cl.
C08G 77/62 (2006.01)
C09D 183/16 (2006.01)
B05D 1/00 (2006.01)
B05D 3/02 (2006.01)
C01B 33/12 (2006.01)

(52) U.S. Cl.
CPC ........... C09D 183/16 (2013.01); B05D 1/005 (2013.01); B05D 3/0254 (2013.01); C01B 33/126 (2013.01); C08G 77/62 (2013.01)

(58) Field of Classification Search
CPC .................................................. C08G 77/62
See application file for complete search history.

(56) References Cited

U.S. PATENT DOCUMENTS

| | | | | |
|---|---|---|---|---|
| 4,482,669 A | * | 11/1984 | Seyferth | C04B 35/571 524/442 |
| 4,595,775 A | * | 6/1986 | Arkles | C07F 7/21 501/88 |
| 4,659,850 A | | 4/1987 | Arai et al. | |
| 4,833,107 A | * | 5/1989 | Kaya | C04B 35/589 264/626 |
| 4,840,778 A | | 6/1989 | Arai et al. | |
| 4,861,569 A | | 8/1989 | Funayama et al. | |
| 4,946,920 A | | 8/1990 | Vaahs et al. | |
| 4,975,512 A | | 12/1990 | Funayama et al. | |
| 5,268,496 A | | 12/1993 | Geisberger | |
| 5,459,114 A | * | 10/1995 | Kaya | C04B 35/589 106/287.11 |
| 5,905,130 A | | 5/1999 | Nakahara et al. | |
| 5,922,411 A | | 7/1999 | Shimizu et al. | |
| 2002/0034885 A1 | * | 3/2002 | Shindo | C09D 183/16 438/789 |
| 2012/0156893 A1 | | 6/2012 | Ozaki et al. | |
| 2013/0178595 A1 | * | 7/2013 | Yang | C08G 77/62 528/27 |
| 2013/0277808 A1 | * | 10/2013 | Hayashi | C03C 1/008 257/622 |

FOREIGN PATENT DOCUMENTS

| | | |
|---|---|---|
| AU | 6568786 A | 6/1987 |
| JP | S60226890 A | 11/1985 |
| JP | S62156135 A | 7/1987 |
| JP | S62156136 A | 7/1987 |
| JP | S6316325 B2 | 4/1988 |
| JP | H01138107 A | 5/1989 |
| JP | H01138108 A | 5/1989 |
| JP | H01188531 A | 7/1989 |
| JP | 2-175726 * | 7/1990 |

(Continued)

OTHER PUBLICATIONS

English language translation JP 2-175726, Jul. 1990.*
International Search Report for PCT/JP2015/062219 dated Jul. 21, 2015.

Primary Examiner — Margaret G Moore
(74) Attorney, Agent, or Firm — Drinker Biddle & Reath LLP

(57) ABSTRACT

A copolymerized polysilazane comprising at least repeating units represented by general formula (I): —Si($R^1$)($R^2$)—$NR^3$— and repeating units represented by general formula (II): —Si($R^1$)($R^2$)—NH— (in the formulas, $R^1$ and $R^2$ each independently represent a hydrogen atom, hydrocarbon group, hydrocarbon group-containing silyl group, hydrocarbon group-containing amino group, or hydrocarbon oxy group, and $R^3$ represents an alkyl group, alkenyl group, alkoxy group, cycloalkyl group, aryl group or alkyl silyl group), and the $NR^3/SiH_{1,2}$ ratio ($SiH_{1,2}$ represents the total amount of $SiH_1$ and $SiH_2$) is 0.005-0.3. Said copolymerized polysilazane can be manufactured by reacting Si($R^1$)($R^2$)$X_2$ (in the formula, X represents a halogen atom) with a primary amine compound: $R^3NH_2$ and then reacting with ammonia, and is able to form a siliceous film that has withstand voltage characteristics and solvent resistance by curing at a low temperature.

20 Claims, 2 Drawing Sheets

(56) References Cited

FOREIGN PATENT DOCUMENTS

| | | |
|---|---|---|
| JP | H02175726 A | 7/1990 |
| JP | H06157764 A | 6/1994 |
| JP | H06200036 A | 7/1994 |
| JP | H06299118 A | 10/1994 |
| JP | H0931333 A | 2/1997 |
| JP | 2613787 B2 | 5/1997 |
| JP | H09275135 A | 10/1997 |
| JP | 2005045230 A | 2/2005 |
| JP | 2011054898 A | 3/2011 |
| WO | WO-9724391 A1 | 7/1997 |

\* cited by examiner

COPOLYMERIZED POLYSILAZANE, MANUFACTURING METHOD THEREFOR, COMPOSITION COMPRISING SAME, AND METHOD FOR FORMING SILICEOUS FILM USING SAME

CROSS-REFERENCE TO RELATED APPLICATIONS

This application is a national stage application (under 35 U.S.C. § 371) of PCT/JP2015/062219, filed Apr. 22, 2015, which claims benefit of Japanese Application No. 2014-089831, filed Apr. 24, 2014, both of which are incorporated herein by reference in their entirety.

TECHNICAL FIELD

The present invention relates to a new copolymerized polysilazane, more particularly to a new copolymerized polysilazane which is useful for forming a siliceous film at a low temperature. The present invention also relates to a method for manufacturing the copolymerized polysilazane, a composition comprising the copolymerized polysilazane, and a method for forming a siliceous film using the composition.

BACKGROUND ART

It has been known that a polysilazane, particularly a perhydropolysilazane soluble in an organic solvent is useful as a silicon nitride precursor (see Patent document 1, for example). In recent years, it has been known that a method in which a coating composition comprising a polysilazane is applied and then converted into a siliceous film by curing, as a method for forming an interlayer dielectric in electronic devices such as a semiconductor device (see Patent documents 2 to 5, for example).

The perhydropolysilazane has a repeating unit represented by —SiH$_2$—NH— and Patent document 1 discloses a synthesis method of perhydropolysilazane, in which adducts composed of a dihalosilane and a base are reacted with ammonia.

In addition to this, there have been proposed various other methods for synthesizing a polysilazane, such as (a) a method for reacting a silicon halide such as SiCl$_4$, SiH$_2$Cl$_2$ or the like with an amine, (b) a method for preparing a polysilazane from a silazane by use of a dehydrogenating catalyst consisting of an alkali metal hydride such as KH, (c) a method for synthesizing a silazane by a dehydrogenation reaction of a silane compound and an amine compound by use of a transition metal complex catalyst, (d) a method for preparing a polysilazane by performing an amine exchange of aminosilane with ammonia by use of an acid catalyst such as CF$_4$SO$_3$H, (e) a method for performing an amine exchange of an aminosilane with a large amount of ammonia or amine, (f) a method for performing an amine exchange reaction of a polyvalent aminosilane compound with a polyhydrogenated nitrogen-containing compound in the presence of a basic catalyst, etc. (see Patent document 6, for example).

The film formed by converting the polysilazane into siliceous materials is used as various kinds of films such as a passivation film, a protective film, and a planarization film in electronic devices such as a semiconductor device other than the aforementioned interlayer dielectric. However, these films in the electronic devices require various properties such as an insulation property, flatness of a film, resistance to an acid, an alkali, solvent, and the like, a high barrier property, and so on. Though a film fulfilling these properties can be produced by forming a siliceous film by use of a coating liquid containing the polysilazane, siliceous films having high withstand voltage characteristics and an excellent solvent resistance property cannot be obtained by a low temperature curing when the perhydropolysilazane is used as the polysilazane. Therefore, for converting the perhydropolysilazane into a siliceous film having an excellent insulation property, high withstand voltage characteristics, and an excellent solvent resistance property, it was necessary to contact the siliceous film with steam at a high temperature.

CITATION LIST

Patent Documents

Patent document 1: JP 63-016325 B
Patent document 2: JP 2011-054898 A
Patent document 3: JP 2005-045230 A
Patent document 4: JP 09-031333 A
Patent document 5: JP 09-0275135 A
Patent document 6: WO 97/24391 A

DISCLOSURE OF THE INVENTION

Problems to be Solved by the Invention

The present invention has been made under the situation described above and an object of the present invention is to provide a copolymerized polysilazane, which can form a siliceous film having high withstand voltage characteristics and an excellent solvent resistance property by a curing process at a low temperature.

Another object of the present invention is to provide a method for manufacturing the copolymerized polysilazane, a composition comprising the copolymerized polysilazane, and a method for forming a siliceous film having high withstand voltage characteristics and an excellent solvent resistance property after a curing process at a low temperature by using the composition.

Means for Solving the Problems

As a result of intensive studies and investigations, the inventors have found that a copolymerized polysilazane compound is obtained by conducting both an aminolysis, in which a dihalosilane compound is reacted with a primary amine compound, and an ammonolysis, in which a dihalosilane compound is reacted with ammonia, in solution and the resulting copolymerized polysilazane compound can be converted to a siliceous film having higher withstand voltage characteristics and an better solvent resistance property compared with the conventionally known inorganic polysilazane, at a curing temperature of 300° C. or lower. The present invention was accomplished based on these findings.

The present invention, therefore, relates to a copolymerized polysilazane, a method for manufacturing the copolymerized polysilazane, a composition comprising the copolymerized polysilazane, and a method for forming a siliceous film by using the composition, which are mentioned below.

(1) A copolymerized polysilazane which comprises at least a repeating unit represented by the formula (I) below and a repeating unit represented by the formula (II) below and has a $NR^3/SiH_{1,2}$ ratio of 0.005 to 0.3, wherein $SiH_{1,2}$ represents the total amount of $SiH_1$ and $SiH_2$.

Formula (I)

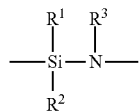

(I)

In the formula, $R^1$ and $R^2$ each independently represents a hydrogen atom, a hydrocarbon group, a hydrocarbon group-containing silyl group, a hydrocarbon group-containing amino group, or a hydrocarbon oxy group and $R^3$ represents an alkyl group, an alkenyl group, an alkoxy group, a cycloalkyl group, an aryl group, or an alkyl silyl group.

Formula (II)

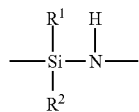

(II)

In the formula, $R^1$ and $R^2$ represent the same meanings as above.

(2) The copolymerized polysilazane according to (1) above, wherein all of $R^1$ and $R^2$ in the formulae (I) and (II) are a hydrogen atom.

(3) The copolymerized polysilazane according to (1) or (2) above, a weight-average molecular weight in terms of polystyrene of which is 700 to 4,000.

(4) A method for manufacturing the copolymerized polysilazane according to (1), wherein a dihalosilane compound represented by the formula (III):

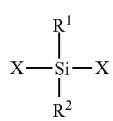

(III)

in which, $R^1$ and $R^2$ each independently represents a hydrogen atom, a hydrocarbon group, a hydrocarbon group-containing silyl group, a hydrocarbon group-containing amino group, or a hydrocarbon oxy group, and X represents F, Cl, Br, or I,
is reacted with a primary amine compound represented by the formula (IV):

$$R^3—NH_2 \quad (IV)$$

in which, $R^3$ represents an alkyl group, an alkenyl group, an alkoxy group, a cycloalkyl group, an aryl group, or an alkyl silyl group, and then reacted with ammonia.

(5) The method for manufacturing the copolymerized polysilazane according to (4) above, wherein the primary amine compound is used at a molar ratio of 0.1 to 3.0 to the dihalosilane compound and ammonia is used at a molar ratio of 0.2 to 3.1 to the dihalosilane compound.

(6) The method for manufacturing the copolymerized polysilazane according to (4) or (5) above, wherein the reaction is performed in solution, adducts of the dihalosilane compound with a base are formed by reacting the dihalosilane compound with the base before the reaction with the primary amine compound, and then the adducts of the dihalosilane compound are reacted with the primary amine compound.

(7) The method for manufacturing the copolymerized polysilazane according to any one of (4) to (6) above, wherein both of $R^1$ and $R^2$ in the formula (III) are a hydrogen atom and X is a chlorine atom.

(8) A coating composition which comprises the copolymerized polysilazane according to any one of (1) to (3) above.

(9) A method for forming a siliceous film, which comprises steps of applying the coating composition described in (8) above to a substrate, drying the composition, and then heating the dried composition at a temperature of 300° C. or lower in an oxidizing atmosphere.

Advantageous Effect of the Invention

In the conventional methods for forming a siliceous film using perhydropolysilazane, it was necessary to cure at a high temperature and when cured at a low temperature, a siliceous film having satisfactory characteristics in withstand voltage characteristics, a solvent resistance property, and the like could not be obtained. However, when the copolymerized polysilazane of the present invention is used, a siliceous film having high withstand voltage characteristics and an excellent solvent resistance property can be formed by curing at a low temperature of 300° C. or lower. Therefore, the copolymerized polysilazane of the present invention can be applied when preparing an interlayer dielectric of the semiconductor element etc., the heat resistance of which is not sufficient.

MODE FOR CARRYING OUT THE INVENTION

Figure 1:
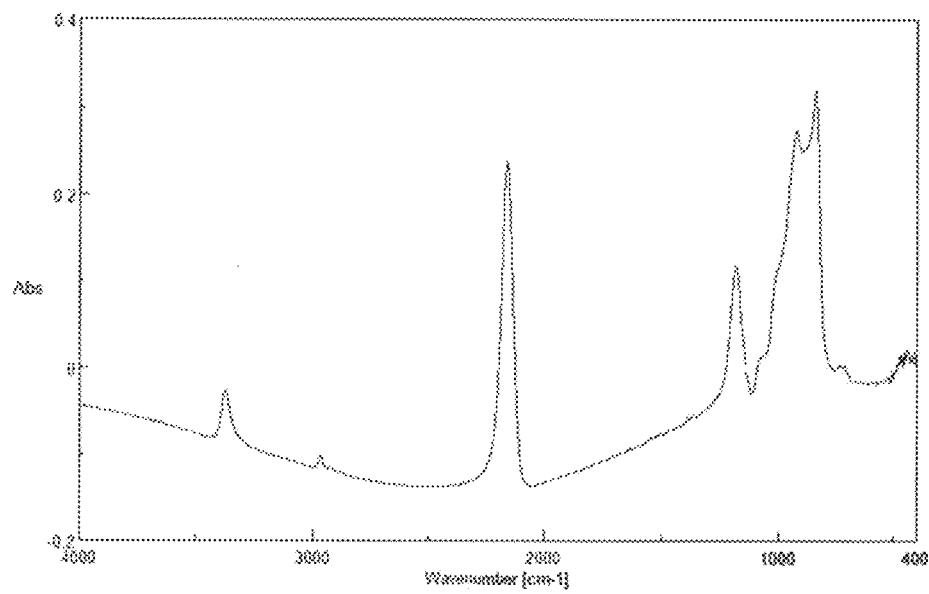
FIG. 1 is a FT-IR spectrography of the copolymerized polysilazane obtained in Example 2.

As described above, the copolymerized polysilazane of the present invention is a copolymerized polysilazane which comprises at least a repeating unit represented by the formula (I): —Si($R^1$)($R^2$)—$NR^3$— and a repeating unit represented by the formula (II): —Si($R^1$)($R^2$)—NH— (in the formulae, $R^1$ and $R^2$ each independently represents a hydrogen atom, a hydrocarbon group, a hydrocarbon group-containing silyl group, a hydrocarbon group-containing amino group, or a hydrocarbon oxy group, and $R^3$ represents an alkyl group, an alkenyl group, an alkoxy group, a cycloalkyl group, an aryl group or an alkyl silyl group), and the $NR^3/SiH_{1,2}$ ratio of which is 0.005 to 0.3.

The copolymerized polysilazane of the present invention can be prepared, for example, by using an aminolysis in which a dihalosilane compound is reacted with a primary amine compound and an ammonolysis in which a dihalosilane compound is reacted with ammonia, in solvent in combination. In this process, a copolymerized polysilazane containing a skeleton, wherein a group bound to a nitrogen atom constituting the skeleton is substituted by a group except a hydrogen atom, in the polymer can be obtained by conducting an aminolysis using a primary amine compound and then conducting an ammonolysis using ammonia.

The solvent may be any solvents so long as these can dissolve the dihalosilane compound, the primary amine compound, and the copolymerized polysilazane formed and do not react with compounds used in manufacturing the copolymerized polysilazane, intermediate products, and final products. Preferred examples thereof include, for example, (a) aromatic compounds such as benzene, toluene, xylene, ethyl benzene, diethyl benzene, trimethyl benzene, and triethyl benzene; (b) saturated hydrocarbon compounds such as n-pentane, i-pentane, n-hexane, i-hexane, n-heptane, i-heptane, n-octane, i-octane, n-nonane, i-nonane, n-decane, and i-decane; (c) alicyclic hydrocarbon compounds such as ethyl cyclohexane, methyl cyclohexane, cyclohexane, cyclohexene, p-menthane, decahydronaphthalene, dipentene, and limonene; and (d) ethers such as dipropyl ether, dibutyl ether, diethyl ether, methyl tert-butyl ether, and anisole.

As the dihalosilane compound, there are used dihalosilane compounds represented by the formula: $Si(R^1)(R^2)X_2$ (in the formula, $R^1$ and $R^2$ each independently represents a hydrogen atom, a hydrocarbon group, a hydrocarbon group-containing silyl group, a hydrocarbon group-containing amino group, or a hydrocarbon oxy group, and X represents F, Cl, Br, or I). Of these, dichlorosilane compounds wherein X is a chlorine atom are preferred from a viewpoint of raw material prices etc. Examples of the hydrocarbon group of $R^1$ and $R^2$ include a straight chain, branch or cyclic alkyl group, which may be substituted by a halogen group, a cyano group, an aryl group, or the like, such as a methyl group, an ethyl group, a propyl group, a 3-chloropropyl group, a 3,3,3-trifluoropropyl group, and a 3-cyanopropyl group; an alkenyl group such as a vinyl group and an allyl group; an aralkyl group such as a benzyl group; and an aryl group such as a phenyl group. Examples of the hydrocarbon oxy group include an alkoxy group such as a methoxy group and an ethoxy group, a cycloalkyloxy group, and an aryloxy group.

Preferred specific examples of the dichlorosilane compounds include dichlorosilane, methyl(hydro)dichlorosilane, ethyl(hydro)dichlorosilane, vinyl(hydro)dichlorosilane, allyl(hydro)dichlorosilane, phenyl(hydro) dichlorosilane, benzyl(hydro)dichlorosilane, dimethyldichlorosilane, methylphenyldichlorosilane, diphenyldichlorosilane, methylvinyldichlorosilane, divinyldichlorosilane, diethyldichlorosilane, ethylmethyldichlorosilane, ethylphenyldichlorosilane, ethylvinyldichlorosilane, ethoxymethyldichlorosilane, ethoxyethyldichlorosilane, ethoxyphenyldichlorosilane, ethoxyvinyldichlorosilane, methyl3,3,3-trifluoropropyldichlorosilane, allylmethyldichlorosilane, 3-chloropropylmethyldichlorosilane, methylpropyldichlorosilane, diethoxydichlorosilane, and 3-cyanopropyimethyldichlorosilane. Of these, dichlorosilane is particularly preferred from the viewpoint of reactivity, raw material prices, and the like. In addition, the dichlorosilane compounds are not limited to the aforementioned compounds and the dihalosilane compounds are not limited to the dichlorosilane compounds.

The alkyl group of $R^1$ in the primary amine compound represented by the formula (IV) can be any alkyl group and is not limited particularly. Examples of the alkyl group include a methyl group, an ethyl group, an n-propyl group, an isopropyl group, an n-butyl group, a sec-butyl group, an isobutyl group, a pentyl group, and a hexyl group. Of these, the propyl group and the butyl group are preferred. Specific examples of the primary amine compound include alkylamines such as propylamine, isopropylamine, sec-butylamene, and isobutylamine, cyclic alkylamines such as cyclohexylamine, alkenylamines such as allylamine, and aromatic amines such as aniline. However, the primary amines used in the present invention is not limited to these specifically exemplified compounds.

As the aminolysis, there is preferably exemplified a method in which the dihalosilane compound represented by the formula (III) described above is reacted with a base and adducts of the dihalosilane compound formed are reacted with the primary amine (see Patent document 1, for example). The dihalosilane is generally acidic and can form adducts by reacting with a base. The formation rate of adducts and the stability as adducts depend on the degree of acidity of the dihalosilane and the degree of basicity of the basic compound as well as the steric factor. The stability of adducts in this case does not always mean the stability like that adducts can be isolated. That is, the stability also includes a case where adducts are present in solvent stably, a case where adducts function as a reaction intermediate substantially, etc. The base used may be selected from bases which can form stable adducts and can easily form the prescribed copolymerized polysilazane after aminolysis and ammonolysis, depending on a kind of the dihalosilane used.

Examples of the base include Lewis bases, tertiary amines, pyridine, picoline and derivatives thereof, secondary amines having a sterically hindered group, phosphine, stibine, and derivatives thereof. Of these, bases having a low boiling point and a lower basicity than the primary amine and ammonia are preferable and pyridine and picoline are particularly preferable in terms of the handling and economy. The amount thereof may be present in an amount greater than the stoichiometric amount to dihalosilane used. The formation of adducts is performed, for example, by adding the dihalosilane compound to a mixture solution of the solvent and the base, which is adjusted to the temperature between −40° C. and 20° C., and continuously stirring the resulting solution at the same temperature for, for example, 30 to 120 minutes.

In addition, since pyridine used as the base is also preferably used as a solvent, following processes may be adapted. That is, first, adducts are formed by adding the dihalosilane in an excess amount of pyridine, then the primary amine is added to the resulting solution to conduct the aminolysis, and ammonia is added to the solution after the aminolysis to conduct the ammonolysis.

The aminolysis can be conducted by reacting, for example, at a temperature of −5° C. to 15° C. for 0.5 to 2 hours. Furthermore, the ammonolysis can be conducted, for example, by injecting ammonia into the reaction solution at a temperature of −5° C. to 15° C. and reacting by stirring the solution for 0.5 to 2 hours at the same temperature.

The amount of the primary amine compound used is in the range of 0.1 to 3.0 as a molar ratio to one mole of the dihalosilane compound, preferably in the range of 0.5 to 2.0. The amount of ammonia used is in the range of 0.2 to 3.1 as a molar ratio to one mole of the dihalosilane compound, preferably in the range of 1.2 to 2.7. When the amount of the primary amine compound used is less than 0.1 as a molar ratio to one mole of the dihalosilane compound or the amount of ammonia used is more than 3.1 as a molar ratio to one mole of the dihalosilane compound, the siliceous film manufactured by curing at a low temperature does not have adequate withstand voltage characteristics and adequate resistance to solvent. On the contrary, when the amount of the primary amine compound used is more than 3.0 as a molar ratio to one mole of the dihalosilane compound or the amount of ammonia used is less than 0.2 as a molar ratio to one mole of the dihalosilane compound, polymerization between molecules does not proceed and copolymerized polysilazanes suitable for applying to the surface of the substrate cannot be obtained.

In addition, though it is considered that —(Si($R^1$)($R^2$)—N$R^3$)n- is produced in the aminolysis of the present invention, the value of n is small and it is considered that most of the compounds produced are a N$R^3$—Si($R^1$)($R^2$)—N$R^3$ monomer from the result of Comparative example 1 mentioned later. Furthermore, it is considered that the polymerization is promoted by the ammonolysis of the compounds obtained by the aminolysis and as a result, the primary amine compound can be sufficiently reacted and copolymers having the prescribed N$R^3$/SiH$_{1,2}$ ratio and molecular weight can be formed. But the present invention is not restricted to this consideration.

Thus, the copolymerized polysilazanes, the N$R^3$/SiH$_{1,2}$ ratio of which is within the range of 0.005 to 0.3, preferably 0.0095 to 0.26, more preferably 0.05 to 0.1, are obtained. When the N$R^3$/SiH$_{1,2}$ ratio in the copolymerized polysilazane is less than 0.005, the siliceous film formed by curing at a low temperature does not have adequate withstand voltage characteristics and adequate resistance to solvent. On the other hand, when the ratio exceeds 0.3, the copolymerized polysilazane obtained is not suitable for applying to the surface of the substrate as adhesion to the substrate decreases. The molecular weight of the copolymerized polysilazane of the present invention is preferably 700 to 4,000 as a weight average molecular weight (Mw) in terms of polystyrene, more preferably 1,300 to 2,500. Therefore, the reaction temperature, the reaction time etc. in addition to the aforementioned amounts of the primary amine and ammonia may be adjusted as needed so as to be able to obtain a copolymerized polysilazane having such a molecular weight. The SiH$_3$/SiH$_{1,2}$ ratio of the copolymerized polysilazane of the present invention is in the range of 0.05 to 0.4, preferably in the range of 0.06 to 0.35, more preferably in the range of 0.14 to 0.31. The NH/SiH ratio of the copolymerized polysilazane of the present invention is in the range of 0.08 to 0.16, preferably in the range of 0.10 to 0.15, more preferably in the range of 0.12 to 0.15.

After the insoluble byproducts in the solution containing the copolymerized polysilazane obtained was removed by filtration, the solvent, the base, and the like are removed by the vacuum distillation etc. as needed and a copolymerized polysilazane-containing solution having the prescribed concentration or a copolymerized polysilazane simple substance is obtained. When pyridine and other organic solvents are contained in the reaction solvent, pyridine is normally removed by the vacuum distillation and other organic solvents are removed if necessary. By adjusting the concentration of the polysilazane resin in the organic solvent solution to the range of, for example, 5 to 30 weight-%, the polysilazane resin-containing solution obtained can be used as it is as a coating composition or used as a base solution of a coating composition. A coating composition can be made by adding other additives or solvents to the base solution of the coating composition, as needed.

The coating composition of the present invention comprises the solvent other than the copolymerized polysilazane of the present invention as mentioned above. The solvent used may be any solvent if it can dissolve the copolymerized polysilazane of the present invention and additives if used, and does not react with the copolymerized polysilazane and the additives. Preferred examples thereof include, but are not limited to, the same solvents as the aforementioned solvents exemplified as the reaction solvent used at the time of the reaction. Of course the solvent used at the time of the reaction may be used as it is as the solvent of the coating composition and other solvents may be added to the reaction solvent, as mentioned above.

As the solvent, there can be used a mixed solvent, in which two kinds or more of solvents are suitably mixed for regulating an evaporation speed of solvent, lowering harmfulness for the human body or regulating solubility of components contained in the coating composition. The copolymerized polysilazane solution used for the coating composition may be made by dissolving the copolymerized polysilazane of the present invention in an organic solvent.

The additives may be added to the coating composition, as needed. Examples of the additives include compounds which promote a silica conversion reaction such as metal carboxylates, N-heterocyclic compounds, and amine compounds, disclosed in JP 06-299118 A. As other examples of the additives, a viscosity adjusting agent, a crosslinking promoter etc. are exemplified, for example. Furthermore, phosphorus compounds such as tris(trimethylsilyl)phosphate can be also contained in the coating composition for obtaining a gettering effect of sodium when the coating composition is used in a semiconductor device. The copolymerized polysilazane-containing solution obtained are preferably circulating-filtrated using a filter having a filtration accuracy of 0.1 μm or less to reduce coarse particles having a particle size of 0.2 μm or more to 50 particles/cc or less.

The content of each component mentioned above is varied by application conditions, curing (baking) conditions, and so on. However, the content of the copolymerized polysilazane is preferably 0.1 to 40 weight-%, more preferably 0.2 to 30 weight-%, further more preferably 0.3 to 25 weight-% relative to the total weight of the coating composition. In addition, the contents of various kinds of additives other than the copolymerized polysilazane are preferably 0.001 to 40 weight-%, more preferably 0.005 to 30 weight-%, further more preferably 0.01 to 20 weight-% relative to the weight of the polysilazane compound, though those are varied by the kinds of the additives etc.

The copolymerized polysilazane-containing coating composition is applied to a surface of a substrate to form a siliceous film on the substrate. As methods for applying the coating composition, conventionally known coating methods such as a spin coating method, a dip coating method, a spray coating method, a transfer method, and so on are exemplified. Of these, the spin coating method is particularly preferred. The coated film can be made to the intended film thickness by one application action or 2 or more of repeating application procedures, as needed. Examples of the substrate to which the coating composition is applied include a silicon substrate, a glass substrate, a resin film etc. The coating composition may be applied to a substrate, on which a semiconductor film, a circuit, or the like was formed in a semiconductor element formation process, if necessary. The thickness of the coated film is usually made to a dry film thickness of 10 to 2,000 nm, preferably 20 to 1,000 nm though it is varied by the intended purpose of the film.

After the coated film of the copolymerized polysilazane was formed by application of the coating composition, the coated film is preferably prebaked (heat-treated) for drying the coated film. The prebake is generally performed by heating the coated film at a low temperature for a short time as this process is not intended to cure the copolymerized polysilazane. The prebake is specifically performed at 70 to 150° C., preferably at 100 to 150° C. for 1 to 10 minutes, preferably for 3 to 5 minutes.

After the application process, the coated film is subjected to a curing process. In the conversion process of the copolymerized polysilazane to the siliceous film according to the present invention, the curing process is conducted at a temperature of 300° C. or lower. The conversion of the copolymerized polysilazane to the siliceous film, that is, the curing proceeds at an extremely low temperature in the present invention. The curing is preferably conducted in an atmosphere containing steam, oxygen, or a mixture gas thereof, that is, in an oxidizing atmosphere. The concentration of steam in a steam oxidation is an important factor for converting the polysilazane resin into the siliceous film (silicon dioxide) and is preferably 1% or more, more preferably 10% or more, most preferably 20% or more. In particular, when the concentration of steam is 20% or more, the conversion of the polysilazane resin to the siliceous film proceeds more easily, the occurrence of defects such as a void etc. decreases, and the properties of the siliceous film are improved. Therefore, it is preferred that the steam concentration is 20% or more. The curing is conducted using a curing oven or a hot plate. When an inert gas is used as the atmospheric gas, nitrogen gas, argon gas, helium gas, or the like is used.

The heating rate till a target temperature is generally 0.1 to 100° C./minute and it is desirable that the curing time after the temperature reached to the target temperature is set generally to one minute to 10 hours, preferably to 30 minutes to 3 hours.

In the present invention, multiple layers of coated thin films may be formed on the coated thin film by repeatedly conducting the aforementioned processes, as needed. When the two layers or more of the coated thin films are deposited, the film thickness of each deposited thin film can be made thinner. As a result, when each of the coated thin films is cured, an enough amount of the oxygen atom can be diffused and supplied to every parts in the thickness direction of the film from the surface thereof and a siliceous film having more excellent properties can be formed.

The thus obtained siliceous film is preferably used for an interlayer dielectric in electronic devices such as a semiconductor device. Furthermore, the siliceous film obtained can also be preferably used as a planarization film, a protective film, a passivation film, a hard mask, a stress adjusting film, a sacrifice film etc. in electronic devices such as a semiconductor device.

EXAMPLES

Hereinafter, the present invention will be more specifically explained with reference to Examples and Comparative examples but the present invention is not limited to these Examples and Comparative examples mentioned below. In addition, the measurements of the weight-average molecular weights in terms of polystyrene, FT-IR spectrums, and H NMR spectrums of copolymerized polysilazanes obtained by synthesis were conducted using the following apparatuses. Furthermore, the $NR^3/SiH_{1,2}$ ratio, the $SiH_3/SiH_{1,2}$ ratio, and the NH/SiH ratio were obtained by following methods.

<Measurement of Weight-Average Molecular Weight>

The measurement was conducted using GPC manufactured by Shimadzu Corporation as a measurement apparatus and using THF as an eluent <Measurement of FT-IR Spectrum>

The measurement was conducted using FT/IR-6100 manufactured by JASCO Corporation as a measurement apparatus.

<Measurement of $^1$H NMR Spectrum>

The measurement was conducted using NMR (400 MHz) manufactured by JEOL Ltd. as a measurement apparatus.

<Calculation of $NR^3/SiH_{1,2}$ Ratio>

The introduced quantity of the $NR^3$ group was evaluated by calculating the ratio of a peak area derived from one proton of the $NR^3$ group to a peak area derived from a $SiH_1$ group and a $SiH_2$ group in 4.5 to 5.3 ppm, in the $^1$H NMR spectrum.

<Calculation of $SiH_3/SiH_{1,2}$ Ratio>

The ratio of a peak area derived from the $SiH_3$ group in 4.0 to 4.5 ppm to a peak area derived from a $SiH_1$ group and a $SiH_2$ group in 4.5 to 5.3 ppm, in a 1H NMR spectrum was calculated as a $SiH_3/SiH_{1,2}$ ratio.

<Calculation of NH/SiH Ratio>

A coating composition containing a copolymerized polysilazane was spin-coated on a silicon wafer and the coated wafer was maintained at 150° C. for 3 minutes for removing solvent to obtain a silicon wafer with a coated film having a film thickness of 480 to 740 nm. The FT-IR spectrum of the sample obtained was measured. The NH/SiH ratio was calculated as the ratio of a peak area derived from the N—H bond in 3,200 to 3,500 cm$^{-1}$ to a peak area derived from the Si—H bond in 2,000 to 2,500 cm$^{-1}$.

Example 1

After the inside of the reactor was substituted by dry nitrogen gas, 40 g of dehydrated pyridine and 460 g of dehydrated xylene were put into the reactor and then cooled down to 0° C. or lower, followed by addition of 25 g of dichlorosilane (DCS) thereto. After the mixture solution was stirred for one and a half hours, 44 g of isopropylamine was put into the solution and aminolysis was performed at a reaction temperature of −5 to 15° C. for 100 minutes. Subsequently, $NH_3$ was injected into the solution at an injection rate of 250 ml/minute for 4.4 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution A) having a concentration of 20 weight-%, which contains a resin (Resin A) having a weight average molecular weight (Mw) of 1,700, was obtained. By the FT-IR spectrum measurement of the resin obtained, production of a polysilazane compound containing an isopropylamine skeleton was confirmed and the NH/SiH ratio of the resin was 0.10. From the $^1$H NMR spectrum, the $NPr/SiH_{1,2}$ ratio was 0.21 and the $SiH_3/SiH_{1,2}$ ratio was 0.11.

Example 2

Figure 2:
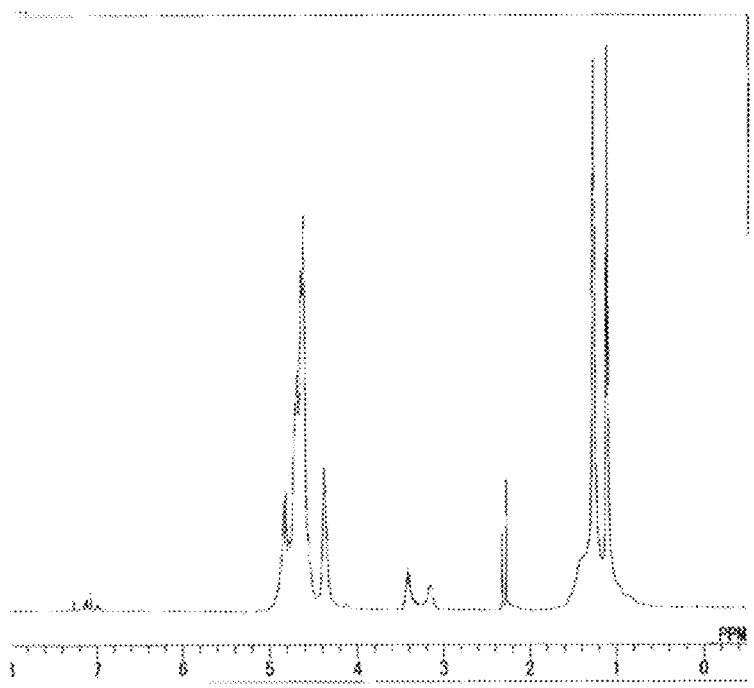
FIG. 2 is a $^1$H NMR spectrography of the copolymerized polysilazane obtained in Example 2.

After the inside of the reactor was substituted by dry nitrogen gas, 40 g of dehydrated pyridine and 456 g of dehydrated xylene were put into the reactor and then cooled down to 0° C. or lower, followed by addition of 25 g of dichlorosilane (DCS) thereto. After stirring of the mixture solution for one and a half hours, 29 g of isopropylamine was put into the solution and aminolysis was performed at a reaction temperature of −5 to 15° C. for 100 minutes. Subsequently, $NH_3$ was injected into the solution at an injection rate of 250 ml/minute for 26.8 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution B) having a concentration of 20 weight-%, which contains a resin (Resin B) having a weight average molecular weight (Mw) of 1,350, was obtained. The FT-IR spectrum and 1H NMR spectrum of the resin B were measured. The FT-IR spectrography obtained is shown in FIG. 1 and the $^1$H NMR spectrography obtained is shown in FIG. 2. From the FT-IR spectrum, production of a polysilazane compound containing an isopropylamine skeleton was confirmed and the NH/SiH ratio was 0.14. From the $^1$H NMR spectrum, the NPr/SiH$_{1,2}$ ratio was 0.10 and the SiH$_3$/SiH$_{1,2}$ ratio was 0.15.

Example 3

Figure 3:
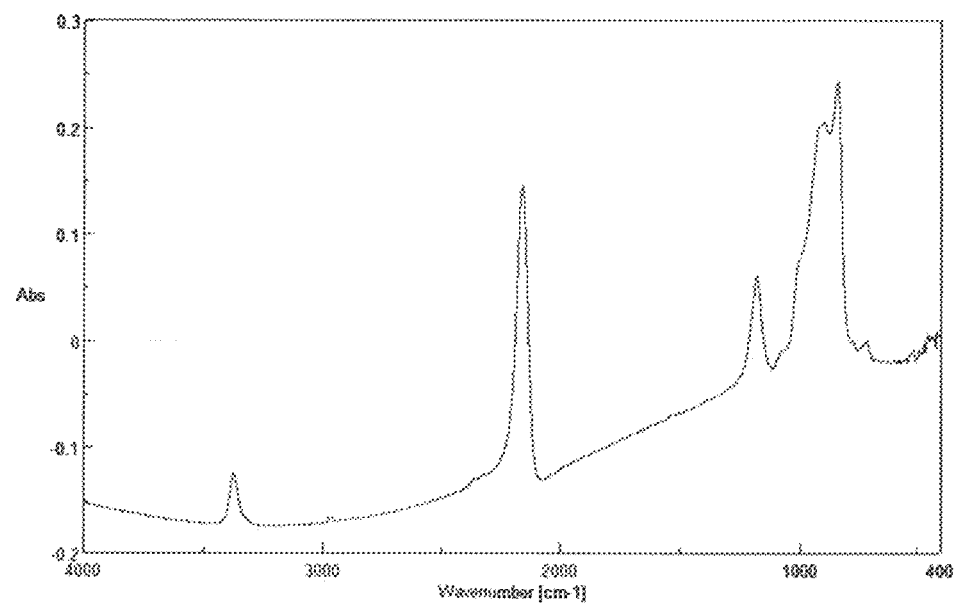
FIG. 3 is a FT-IR spectrography of the copolymerized polysilazane obtained in Example 3.
Figure 4:
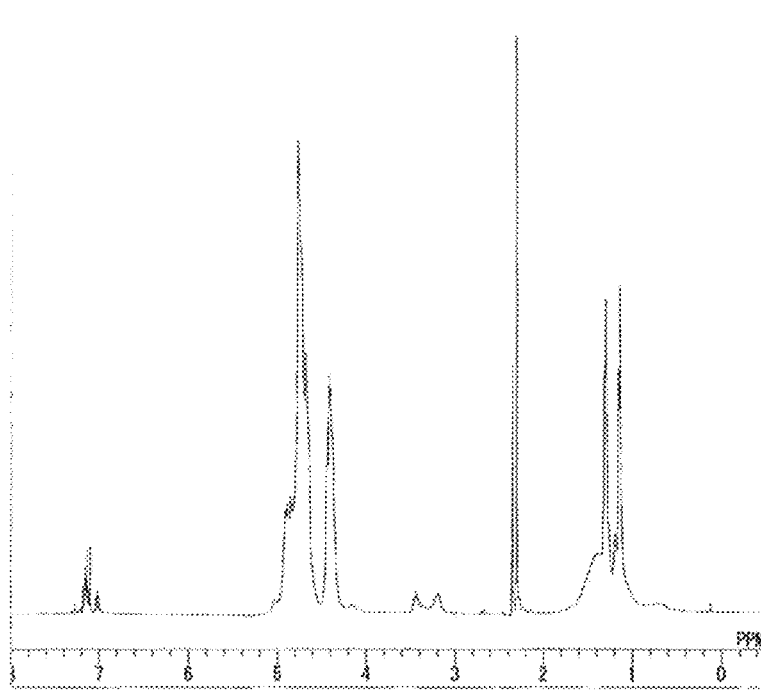
FIG. 4 is a $^1$H NMR spectrography of the copolymerized polysilazane obtained in Example 3.

After the inside of the reactor was substituted by dry nitrogen gas, 41 g of dehydrated pyridine and 456 g of dehydrated xylene were put into the reactor and then cooled down to 0° C. or lower, followed by addition of 26 g of dichlorosilane (DCS) thereto. After stirring of the mixture solution for one and a half hours, 7.8 g of isopropylamine was put into the solution and aminolysis was performed at a reaction temperature of −5 to 15° C. for 100 minutes. Subsequently, NH$_3$ was injected into the solution at an injection rate of 250 ml/minute for 62.4 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution C) having a concentration of 20 weight-%, which contains a resin (Resin C) having a weight average molecular weight (Mw) of 1,950, was obtained. The FT-IR spectrum and 1H NMR spectrum of the resin C were measured. The FT-IR spectrography obtained is shown in FIG. 3 and the $^1$H NMR spectrography obtained is shown in FIG. 4. From the FT-IR spectrum, production of a polysilazane compound containing an isopropylamine skeleton was confirmed and the NH/SiH ratio was 0.13. From the $^1$H NMR spectrum, the NPr/SiH$_{1,2}$ ratio was 0.05 and the SiH$_3$/SiH$_{1,2}$ ratio was 0.31.

Example 4

After the inside of the reactor was substituted by dry nitrogen gas, 38 g of dehydrated pyridine and 456 g of dehydrated xylene were put into the reactor and then cooled down to 0° C. or lower, followed by addition of 25 g of dichlorosilane (DCS) thereto. After stirring of the mixture solution for one and a half hours, 1.5 g of isopropylamine was put into the solution and aminolysis was performed at a reaction temperature of −5 to 15° C. for 100 minutes. Subsequently, NH$_3$ was injected into the solution at an injection rate of 250 ml/minute for 68.8 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution D) having a concentration of 20 weight-%, which contains a resin (Resin D) having a weight average molecular weight (Mw) of 2,100, was obtained. By the FT-IR spectrum measurement, production of a polysilazane compound containing an isopropylamine skeleton was confirmed and the NH/SiH ratio was 0.13. From the $^1$H NMR spectrum, the NPr/SiH$_{1,2}$ ratio was 0.0095 and the SiH$_3$/SiH$_{1,2}$ ratio of the resin was 0.17.

Example 5

After the inside of the reactor was substituted by dry nitrogen gas, 35 g of dehydrated pyridine and 403 g of dehydrated xylene were put into the reactor and then cooled down to 0° C. or lower, followed by addition of 21 g of dichlorosilane (DCS) thereto. After the mixture solution was stirred for one and a half hours, 38 g of sec-butylamine was put into the solution and aminolysis was performed at a reaction temperature of −5 to 15° C. for 60 minutes. Subsequently, NH$_3$ was injected into the solution at an injection rate of 250 ml/minute for 13.2 minutes, followed by stirring for 60 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution E) having a concentration of 20 weight-%, which contains a resin (Resin E) having a weight average molecular weight (Mw) of 700, was obtained. By the FT-IR spectrum measurement, production of a polysilazane compound containing a sec-butylamine skeleton was confirmed and the NH/SiH ratio was 0.12. From the $^1$H NMR spectrum, the N$^s$Bu/SiH$_{1,2}$ ratio was 0.11 and the SiH$_3$/SiH$_{1,2}$ ratio was 0.25.

Example 6

After the inside of the reactor was substituted by dry nitrogen gas, 38 g of dehydrated pyridine and 456 g of dehydrated xylene were put into the reactor and then cooled down to 0° C. or lower, followed by addition of 30 g of dichlorosilane (DCS) thereto. After the mixture solution was stirred for one and a half hours, 8.8 g of propylamine was put into the solution and aminolysis was performed at a reaction temperature of −5 to 15° C. for 100 minutes. Subsequently, NH$_3$ was injected into the solution at an injection rate of 250 ml/minute for 72 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution F) having a concentration of 20 weight-%, which contains a resin (Resin F) having a weight average molecular weight (Mw) of 1,600, was obtained. By the FT-IR spectrum measurement, production of a polysilazane compound containing a propylamine skeleton was confirmed and the NH/SiH ratio was 0.091. From the $^1$H NMR spectrum, the NPr/SiH$_{1,2}$ ratio was 0.26 and the SiH$_3$/SiH$_{1,2}$ ratio was 0.22.

Example 7

After the inside of the reactor was substituted by dry nitrogen gas, 41 g of dehydrated pyridine and 456 g of dehydrated xylene were put into the reactor and then cooled down to 0° C. or lower, followed by addition of 28 g of dichlorosilane (DCS) thereto. After the mixture solution was stirred for one and a half hours, 5.6 g of cyclohexylamine was put into the solution and aminolysis was performed at a reaction temperature of −5 to 15° C. for 100 minutes. Subsequently, NH$_3$ was injected into the solution at an injection rate of 250 ml/minute for 74.4 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution G) having a concentration of 20 weight- %, which contains a resin (Resin G) having a weight average molecular weight (Mw) of 2,500, was obtained. By the FT-IR spectrum measurement, production of a polysilazane compound containing a cyclohexylamine skeleton was confirmed and the NH/SiH ratio of the resin was 0.15. From the $^1$H NMR spectrum, the NHex/SiH$_{1,2}$ ratio was 0.035 and the SiH$_3$/SiH$_{1,2}$ ratio was 0.20.

Example 8

After the inside of the reactor was substituted by dry nitrogen gas, 41 g of dehydrated pyridine and 456 g of dehydrated xylene were put into the reactor and then cooled down to 0° C. or lower, followed by addition of 21 g of dichlorosilane (DCS) thereto. After stirring of the mixture solution for one and a half hours, 3.9 g of aniline was put into the solution and aminolysis was performed at a reaction temperature of −5 to 15° C. for 100 minutes. Subsequently, NH$_3$ was injected into the solution at an injection rate of 250 ml/minute for 56 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution H) having a concentration of 20 weight-%, which contains a resin (Resin H) having a weight average molecular weight (Mw) of 1,700, was obtained. By the FT-IR spectrum measurement, production of a polysilazane compound containing an aniline skeleton was confirmed and the NH/SiH ratio of the resin was 0.14. From the $^1$H NMR spectrum, the NPh/SiH$_{1,2}$ ratio was 0.027 and the SiH$_3$/SiH$_{1,2}$ ratio was 0.35.

Example 9

After the inside of the reactor was substituted by dry nitrogen gas, 391 g of dehydrated pyridine and 44,558 g of dehydrated xylene were put into the reactor and then cooled down to 0° C. or lower, followed by adding 248 g of dichlorosilane (DCS) thereto for 2.5 hours so that the reaction temperature does not exceed 2.5° C. After the mixture solution was stirred for one and a half hours, 293 g of isopropylamine was put into the solution and aminolysis was performed at a reaction temperature of −5 to 15° C. for 60 minutes. Subsequently, NH$_3$ was injected into the solution at an injection rate of 2.5 L/minute for 27.0 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution I) having a concentration of 20 weight-%, which contains a resin (Resin I) having a weight average molecular weight (Mw) of 3,600, was obtained. By the FT-IR spectrum measurement, production of a polysilazane compound containing an isopropylamine skeleton was confirmed and the NH/SiH ratio of the resin was 0.14. From the 1H NMR spectrum, the NPr/SiH$_{1,2}$ ratio was 0.051 and the SiH$_3$/SiH$_{1,2}$ ratio was 0.066.

Comparative Example 1

After the inside of the reactor was substituted by dry nitrogen gas, 16 g of dehydrated pyridine and 185 g of dehydrated xylene were put into the reactor and then cooled down to 0° C. or lower, followed by addition of 10 g of dichlorosilane (DCS) thereto. After the mixture solution was stirred for one and a half hours, 20 g of isopropylamine was put into the solution and aminolysis was performed at a reaction temperature of −5 to 15° C. for 100 minutes. After filtration, the filtrate obtained was mixed with xylene, heated to 40° C., and distilled under a reduced pressure of 5 mmHg to remove pyridine. As a result, a solution (Solution J) having a concentration of 10 weight-%, which contains a resin (Resin J) having a weight average molecular weight (Mw) of less than 100, was obtained. Though the spin-coating of Solution J on a silicon wafer was tried, a coated layer could not be formed on the substrate due to the molecular weight being too low.

Comparative Example 2

A solution (Solution K) of poly(perhydrosilazane) having a weight average molecular weight (Mw) of 5,450, which was obtained by the manufacturing method disclosed in Japanese Patent No. 2613787 was prepared as a coating composition of Comparative example 2.

Comparative Example 3

After the inside of the reactor was substituted by dry nitrogen gas, 39 g of dehydrated pyridine and 455 g of dehydrated xylene were put into the reactor and then cooled down to 0° C. or lower, followed by addition of 25 g of dichlorosilane (DCS) thereto. After the mixture solution was stirred for 2 hours, 29.6 g of propylamine was put into the solution and aminolysis was performed at a reaction temperature of −5 to 15° C. for 90 minutes. Subsequently, NH$_3$ was injected into the solution at an injection rate of 250 ml/minute for 26.8 minutes, followed by stirring for 80 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution L) having a concentration of 20 weight-%, which contains a resin (Resin L) having a weight average molecular weight (Mw) of 510, was obtained. By the FT-IR spectrum measurement, production of a polysilazane compound containing a propylamine skeleton was confirmed and the NH/SiH ratio of the resin was 0.10. From the $^1$H NMR spectrum, the NPr/SiH$_{1,2}$ ratio was 0.43 and the SiH$_3$/SiH$_{1,2}$ ratio was 0.49. Though the spin-coating of Solution L on a silicon wafer was tried, a coated layer could not be formed on the substrate.

Comparative Example 4

After the inside of the reactor was substituted by dry nitrogen gas, 39 g of dehydrated pyridine and 456 g of dehydrated xylene were put into the reactor and then cooled down to 0° C. or lower, followed by addition of 25 g of dichlorosilane (DCS) thereto. After the mixture solution was stirred for one and a half hours, 0.3 g of isopropylamine dissolved in 20 g of xylene was put into the solution and aminolysis was performed at a reaction temperature of −5 to 15° C. for 100 minutes. Subsequently, NH$_3$ was injected into the solution at an injection rate of 250 ml/minute for 70.4 minutes, followed by stirring for 100 minutes while maintaining the temperature at −5 to 15° C. After filtration, the filtrate obtained was mixed with xylene, heated to 40° C., and distilled under a reduced pressure of 5 mmHg to remove pyridine. As a result, a solution (Solution M) having a concentration of 20 weight-%, which contains a resin (Resin M) having a weight average molecular weight (Mw) of 2,000, was obtained. By the FT-IR spectrum measurement, production of a polysilazane compound containing an isopropylamine skeleton was confirmed and the NPr/SiH$_{1,2}$ ratio was 0.002.

<Measurement of Withstand Voltage and Wet Etching Rate>

Solutions A to I prepared in Examples 1 to 9, Solution K of Comparative example 2, and Solution M prepared in Comparative 4 each was spin-coated on a silicon wafer and heated to 150° C. for removing solvent, followed by being maintained at this temperature for 3 minutes. In this process, 1H-DX2 manufactured by MIKASA CO., LTD was used as a spin-coater and Charmant HHP-412 manufactured by AS ONE Corporation was used as a hot plate. Samples obtained were annealed under the 80% steam atmosphere at 300° C. for 1 hour by using a steam curing furnace, 272A-M100 manufactured by KOYO THERMO SYSTEMS CO., LTD. Then, the withstand voltage characteristics and the wet-etching rates thereof were measured by the measurement method described below. The results are shown in Table 1.

(Withstand Voltage Characteristics)

The measurement was conducted using SSM495 272A-M100 manufactured by JAPAN SSM. The electric field at a point of time when the current density was exceeded 1E-6 (A/cm$^2$) was made Fbd (MV/cm).

(Wet-Etching Rate)

The siliceous film formed was immersed in a 0.5% hydrogen fluoride aqueous solution and the reduction rate of the film thickness thereof was measured.

TABLE 1

|  | Fbd (MV/cm) | Wet-etching rate (Å/min) |
|---|---|---|
| Example 1 (Solution A) | 2.41 | 152 |
| Example 2 (Solution B) | 2.95 | 147 |
| Example 3 (Solution C) | 2.91 | 142 |
| Example 4 (Solution D) | 2.67 | 152 |
| Example 5 (Solution E) | 2.38 | 156 |
| Example 6 (Solution F) | 2.72 | 160 |
| Example 7 (Solution G) | 2.07 | 158 |
| Example 8 (Solution H) | 1.52 | 261 |
| Example 9 (Solution I) | 2.56 | 165 |
| Comparative example 2 (Solution K) | 0.47 | 410 |
| Comparative example 4 (Solution M) | 0.65 | 375 |

From Table 1, it is known that the withstand voltage characteristics and solvent resistance of the siliceous film formed by use of the copolymerized polysilazane resin of the present invention having a skeleton, wherein a group bound to a nitrogen atom constituting the skeleton is substituted by a group other than a hydrogen atom, in the polymer can be remarkably improved under the curing condition at 300° C. or lower compared to the siliceous film formed by curing a conventionally known inorganic polysilazane shown in Comparative example 2 at 300° C. In addition, it is also know that the copolymerized polysilazane resin of the present invention has a structure advantageous for oxidation under the curing condition at 300° C. or lower compared to the copolymerized polysilazane resin having a larger NR/SiH$_{1,2}$ ratio and having a skeleton, wherein a group bound to a nitrogen atom constituting the skeleton is substituted by a group other than a hydrogen atom, in the polymer, shown in Comparative example 3 and the copolymerized polysilazane resin having a lower NR/SiH$_{1,2}$ ratio and having a skeleton, wherein a group bound to a nitrogen atom is substituted by a group other than a hydrogen atom, in the polymer, shown in Comparative example 4.

The invention claimed is:

1. A copolymerized polysilazane which comprises at least a repeating unit represented by the formula (I) below and a repeating unit represented by the formula (II) below and has a NR$^3$/SiH$_{1,2}$ ratio of 0.005 to 0.3, wherein SiH$_{1,2}$ represents the total amount of SiH$_1$ and SiH$_2$, Formula (I)

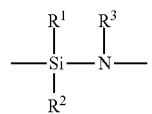

wherein
R$^1$ and R$^2$ each independently represents a hydrogen atom, and
R$^3$ represents an alkyl group, an alkenyl group, an alkoxy group, a cycloalkyl group, an aryl group, or an alkyl silyl group, Formula (II)

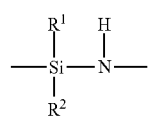

wherein R$^1$ and R$^2$ represent the same meanings as above and wherein the copolymerized polysilazane has a SiH$_3$/SiH$_{1,2}$ ratio in the range of 0.05 to 0.4.

2. The copolymerized polysilazane according to claim 1, a weight-average molecular weight in terms of polystyrene of which is 700 to 4,000.

3. A coating composition which comprises the copolymerized polysilazane according to claim 1.

4. A method for forming a siliceous film, which comprises steps of applying the coating composition according to claim 3 to a substrate, drying the composition, and then heating the dried composition at a temperature of 300° C. or lower in an oxidizing atmosphere.

5. The copolymerized polysilazane according to claim 1, wherein the SiH$_3$/SiH$_{1,2}$ ratio of the copolymerized polysilazane is in the range of 0.06 to 0.35.

6. The copolymerized polysilazane according to claim 1, wherein the SiH$_3$/SiH$_{1,2}$ ratio of the copolymerized polysilazane is in the range of 0.14 to 0.31.

7. The copolymerized polysilazane according to claim 1, which has a weight-average molecular weight in terms of polystyrene of which is 1,300 to 2,500.

8. The copolymerized polysilazane according to claim 1, wherein the NR$^3$/SiH$_{1,2}$ ratio is in the range of 0.0095 to 0.26.

9. The copolymerized polysilazane according to claim 1, wherein the NR$^3$/SiH$_{1,2}$ ratio is in the range of 0.05 to 0.1.

10. The copolymerized polysilazane according to claim 1, wherein the copolymerized polysilazane has a NH/SiH ratio in the range of 0.08 to 0.16.

11. The copolymerized polysilazane according to claim 1, wherein the copolymerized polysilazane has a NH/SiH ratio in the range of 0.1 to 0.15.

12. The copolymerized polysilazane according to claim 1, wherein the copolymerized polysilazane has a NH/SiH ratio in the range of 0.12 to 0.15.

13. The copolymerized polysilazane according to claim 9, wherein the copolymerized polysilazane has a NH/SiH ratio in the range of 0.12 to 0.15.

14. The copolymerized polysilazane according to claim 13, wherein the SiH$_3$/SiH$_{1,2}$ ratio of the copolymerized polysilazane is in the range of 0.14 to 0.31.

15. The copolymerized polysilazane according to claim 14, which has a weight-average molecular weight in terms of polystyrene of which is 1,300 to 2,500.

16. A coating composition which comprises the copolymerized polysilazane according to claim 15.

17. A method for manufacturing a copolymerized polysilazane
wherein the copolymerized polysilazane comprises at least a repeating unit represented by the formula (I) below and a repeating unit represented by the formula (II) below and has a NR$^3$/SiH$_{1,2}$ ratio of 0.005 to 0.3, wherein SiH$_{1,2}$ represents the total amount of SiH$_1$ and SiH$_2$, Formula (I)

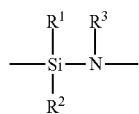

(I)

wherein
R$^1$ and R$^2$ each independently represents a hydrogen atom, a hydrocarbon group, a hydrocarbon group-containing silyl group, a hydrocarbon group-containing amino group, or a hydrocarbon oxy group and
R$^3$ represents an alkyl group, an alkenyl group, an alkoxy group, a cycloalkyl group, an aryl group, or an alkyl silyl group, Formula (II)

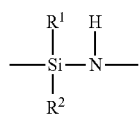

(II)

wherein R$^1$ and R$^2$ represent the same meanings as above and wherein the copolymerized polysilazane has a SiH$_3$/SiH$_{1,2}$ ratio in the range of 0.05 to 0.4,
which comprises reacting a dihalosilane compound represented by the formula (III):

(III)

in which, R$^1$ and R$^2$ each independently represents a hydrogen atom, a hydrocarbon group, a hydrocarbon group-containing silyl group, a hydrocarbon group-containing amino group, or a hydrocarbon oxy group, and X represents F, Cl, Br, or I,
with a primary amine compound represented by the formula (IV):

R$^3$—NH$_2$  (IV)

in which, R$^3$ represents an alkyl group, an alkenyl group, an alkoxy group, a cycloalkyl group, an aryl group, or an alkyl silyl group,
and then reacted with ammonia.

18. The method for manufacturing the copolymerized polysilazane according to claim 17, wherein the primary amine compound is used at a molar ratio of 0.1 to 3.0 to the dihalosilane compound and ammonia is used at a molar ratio of 0.2 to 3.1 to the dihalosilane compound.

19. The method for manufacturing the copolymerized polysilazane according to claim 17, wherein the reaction is conducted in solution, adducts of the dihalosilane compound with a base are formed by reacting the dihalosilane compound and the base before the reaction with the primary amine compound, and then the adducts of the dihalosilane compound are reacted with the primary amine compound.

20. The method for manufacturing the copolymerized polysilazane according to claim 17, wherein both of R$^1$ and R$^2$ in the formula (III) are a hydrogen atom and X is a chlorine atom.

* * * * *